US012295070B2

(12) United States Patent
Saha

(10) Patent No.: US 12,295,070 B2
(45) Date of Patent: May 6, 2025

(54) SYSTEMS AND METHODS FOR INTELLIGENT SELECTION OF ROAMING MODES

(71) Applicant: DISH Wireless L.L.C., Englewood, CO (US)

(72) Inventor: Sougata Saha, Aurora, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 290 days.

(21) Appl. No.: 17/747,935

(22) Filed: May 18, 2022

(65) Prior Publication Data

US 2023/0379688 A1 Nov. 23, 2023

(51) Int. Cl.
*H04W 8/20* (2009.01)
*H04W 8/08* (2009.01)
*H04W 8/12* (2009.01)

(52) U.S. Cl.
CPC ............. *H04W 8/12* (2013.01); *H04W 8/082* (2013.01); *H04W 8/20* (2013.01)

(58) Field of Classification Search
CPC .................................. H04W 8/12; H04W 8/08
See application file for complete search history.

(56) References Cited

U.S. PATENT DOCUMENTS

| 2022/0338085 A1* | 10/2022 | Zong | H04W 36/32 |
| 2023/0276220 A1* | 8/2023 | Wang | H04W 60/00 370/331 |
| 2023/0292206 A1* | 9/2023 | Reeves | H04W 28/0268 |

* cited by examiner

*Primary Examiner* — Michael T Vu
(74) *Attorney, Agent, or Firm* — Seed IP Law Group LLP

(57) ABSTRACT

A roaming network interface system receives an indication that a user device using a first network is to transition to a second network. The roaming network interface system determines whether the second network implements an interface between a mobility management entity and an access management function based on the received indication. The roaming network interface system provides instructions to the user device to transition from the first network to the second network based on the determination of whether the second network implements the interface.

16 Claims, 7 Drawing Sheets

Interface Implementation Table

| Network ID (PLMN/ EARFCN) | Network Type | Type of Interface | |
|---|---|---|---|
| Primary Network (Carrier1 / 1850Mhz UP 2000Mhz Down) | 5G | N26 | 301 |
| Roaming Network 1 (Carrier1 / 1950Mhz UP 2050Mhz Down) | 4G | N26 | 302 |
| Roaming Network 2 (Carrier2 / 1800Mhz UP 2100Mhz Down) | 4G | S8 | 303 |
| ... | ... | ... | |

SYSTEMS AND METHODS FOR INTELLIGENT SELECTION OF ROAMING MODES

BACKGROUND

User devices (or "user equipment") typically connect to a variety of telecommunication networks, such as 4G networks, 5G networks, etc. In many cases, a user device may transition its connection between a primary network and a roaming network based on a variety of reasons. Telecommunication networks do not typically have a reliable method of providing accurate instructions for a user device to transition between the primary network and a roaming network. It is with respect to these and other considerations that the embodiments described herein have been made.

BRIEF SUMMARY

Telecommunication networks, such as 5G networks and 4G networks, typically allow user devices to transition from a primary network to a secondary, or roaming network. While, user devices are able to transition between primary and roaming networks, the primary network is typically unable to reliably determine accurate instructions for transitioning from the primary network to the roaming network when the networks are different types. For example, a primary network that is a 5G network may be unable to determine accurate instructions for a user device to transition to a roaming network that is a 4G network. Likewise, a primary network that is a 4G network may be unable to determine accurate instructions for the user device to transition to a roaming network that is a 5G network.

Additionally, when the primary network is unable to provide the correct instructions or interfaces, the user device may be forced to drop calls, fail to transmit SMS or MMS messages, be unable to access the internet, or cause other issues in service provided to the user device. Furthermore, a single access and mobility management function ("AMF") used by a primary network is unable to provide support for multiple types of interfaces or instructions used to assist a user device in transitioning from a primary network to a roaming network.

The embodiments disclosed herein address the issues above and thus help solve the technical problems and improve the technology of telecommunication networks for transitioning between primary networks and roaming networks by providing a technical solution that uses a single AMF to provide multiple types of interfaces and instructions to assist a user device in transitioning from a primary network to a roaming network. Additionally, embodiments disclosed herein are able to identify which transitioning interfaces are provided by individual roaming networks in order to ensure that the correct interface or instructions are provided to the user device.

In some embodiments, a roaming network interface system receives an indication that a user device using a first network is to transition to a second network, determines whether the second network implements an interface between a mobility management entity ("MME") and an AMF based on the received indication, and provides instructions to the user device to transition from the first network to the second network based on the determination of whether the second network implements the interface.

In some embodiments, a user device detects a signal strength for a signal provided to the user device by a first network to which the user device is currently connected, detects a signal strength of a second network, determines whether the signal strength of the second network is greater than the signal strength of the first network, transmits an indication to a roaming network interface system that the user device is to transition to the second network from the first network based on a determination that the signal strength of the second network is greater than the signal strength of the first network, receives instructions regarding the transition of the user device from the first network to the second network from the roaming network interface system, and causes the user device to transition from the first network to the second network based on the received instructions. The user device may detect one or more roaming networks, and may transmit the one or more roaming networks to the roaming network interface system.

In some embodiments, a method for operating a roaming network interface system includes electronically receiving an indication that a user device using a first network is to transition to a second network, electronically determining whether the second network implements an interface between an MME and an AMF based on the received indication, and electronically providing instructions to the user device to transition from the first network to the second network based on the determination of whether the second network implements the interface.

BRIEF DESCRIPTION OF THE SEVERAL VIEWS OF THE DRAWINGS

FIG. 3 is a table diagram depicting an interface implementation data table 300, according to various embodiments described herein.

DETAILED DESCRIPTION

Figure 1:
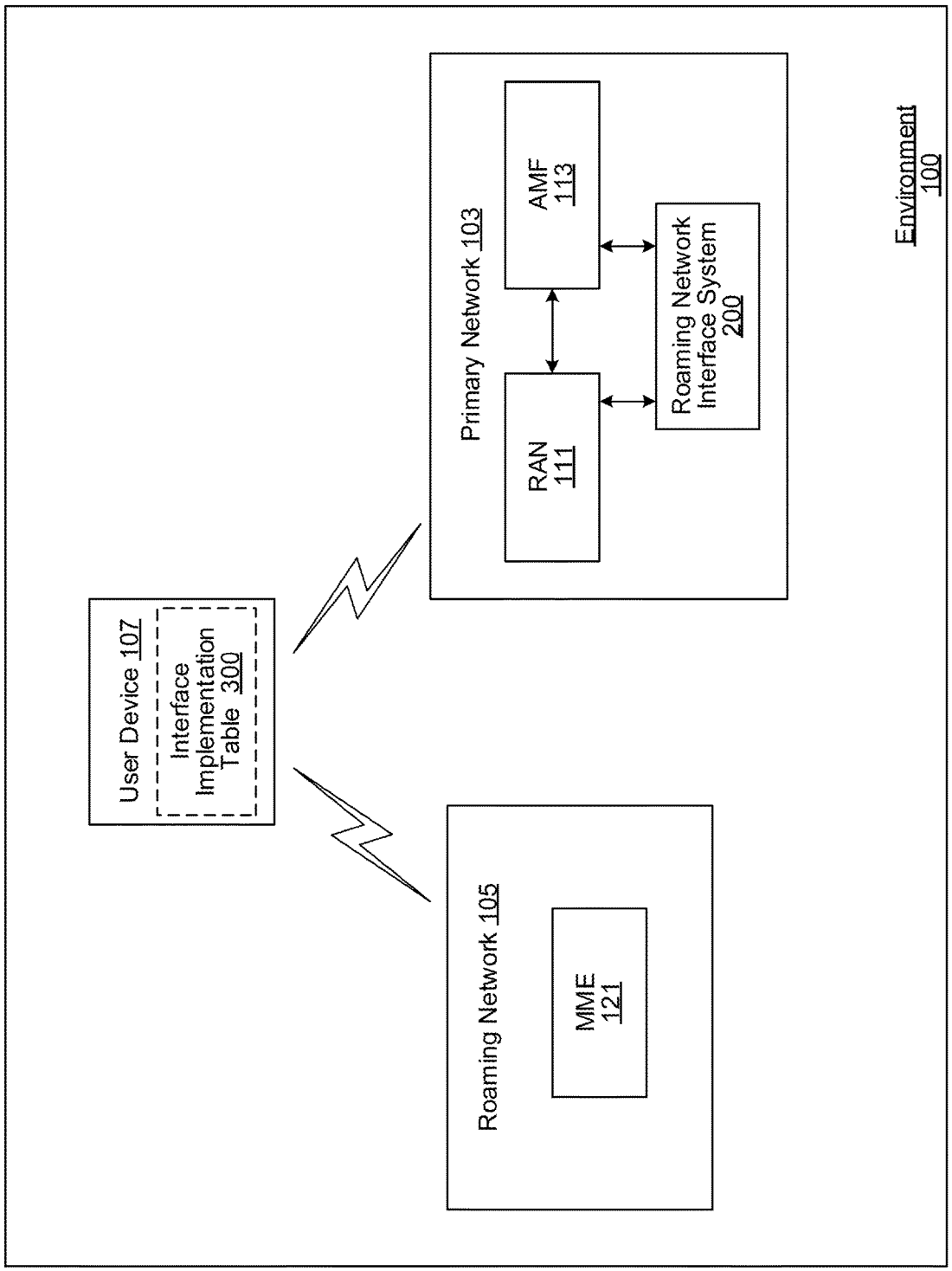
FIG. 1 is a diagram depicting an example of an environment in which the roaming network interface system is implemented.

Network providers, such as telecommunication network providers, cellular network providers, etc., typically allow user devices to transition from a primary network to a roaming network based on a variety of reasons. The roaming network may be another network provided by the network provider, a roaming network provided by other network providers, etc. Furthermore, the roaming networks may not offer the same type of service as the primary network, for example a roaming network may provide 4G service, 5G service, etc. to a user device. A primary network may use an AMF to provide instructions to user devices regarding a transition from a primary network to a secondary network.

However, a single AMF is unable to provide support for multiple types of interfaces or instructions used to assist a user device in transitioning from a primary network to a roaming network, such as a 5G primary network and a 4G roaming network. As a result, the primary network, through the AMF, may be unable to provide accurate instructions for transitioning a user device from a primary network to a roaming network, which causes an interruption in the telecommunication services provided to a user device, such as dropping calls, failing to transmit SMS or MMS messages, being unable to access the interne, or other issues or interruptions in service provided to the user device.

The embodiments disclosed herein address the issues above and thus help solve the technical problems and improve the technology of telecommunication networks for transitioning between primary networks and roaming networks by providing a technical solution that uses a single AMF to provide multiple types of interfaces and instructions to assist a user device in transitioning from a primary network to a roaming network. Additionally, embodiments disclosed herein are able to identify which transitioning interfaces are provided by individual roaming networks in order to ensure that the correct interface or instructions are provided to the user device.

In some embodiments, a roaming network interface system receives an indication that a user device using a first network is to transition to a second network, determines whether the second network implements an interface between an MME and an AMF based on the received indication, and provides instructions to the user device to transition from the first network to the second network based on the determination of whether the second network implements the interface.

In some embodiments, providing instructions to the user device includes providing an interface to the user device based on the determination that the second network implements the interface. The interface may be an N26 interface, an S8 interface, or another interface used to transition user devices from one network to another network. The interface implemented by the second network may be transmitted to the user device by the AMF.

In some embodiments, providing instructions to the user device includes detecting whether an error occurred during the transition of the user device to the second network from the first network. The roaming network interface system may provide instructions to the user device to connect to the second network without the interface based on detecting that the error occurred. The instructions to connect to the second network without the interface may include an indication of a different interface for transitioning a user device from one network to another network. For example, if the roaming network interface system provided an N26 interface to the user device, and a failure in the N26 interface was detected by the roaming network interface system, the roaming network interface system may provide the user device instructions to connect to the roaming network by using an S8 interface. The roaming network interface system may cause the user device to indicate to a user of the user device that networking service may be interrupted. An error may include one or more of: a failure of the interface to transition the user device, an indication that the interface is currently overloaded, or any other type of error that may occur when using an interface to transition a user device from a first network to a second network.

In some embodiments, the roaming network interface system receives an indication of one or more networks from one or more user devices. The indication of one or more networks may include an indication of a signal strength of each networks of the one or more networks. The roaming network interface system may determine whether each of the networks implement an interface between an MMR and an AMF. The roaming network interface system may transmit the determination of whether each of the networks implement an interface to a user device. The roaming network interface system may determine the type of interface that each of the networks implement, such as an N26 interface, S8 interface, or other types of interfaces for transitioning user devices from one network to another. The roaming network interface system may transmit the determination of the type of interface implemented by each network to a user device. The roaming network interface system may cause at least one of the determination of whether each of the networks implement an interface and the determination of the type of interface each of the networks implement in a data table, such as an interface implementation table. The roaming network interface system may use at least one of the determination of whether each of the networks implement an interface and the determination of the type of interface each of the networks implement to determine whether the second network implements an interface for transitioning a user device from one network to another.

In some embodiments, a user device detects a signal strength for a signal provided to the user device by a first network to which the user device is currently connected, detects a signal strength of a second network, determines whether the signal strength of the second network is greater than the signal strength of the first network, transmits an indication to a roaming network interface system that the user device is to transition to the second network from the first network based on a determination that the signal strength of the second network is greater than the signal strength of the first network, receives instructions regarding the transition of the user device from the first network to the second network from the roaming network interface system, and causes the user device to transition from the first network to the second network based on the received instructions. The user device may detect one or more roaming networks, and may transmit the one or more roaming networks to the roaming network interface system.

In some embodiments, the user device receives an indication of an interface implemented on the second network to transition the user device between an MMF and an AMF from the roaming network interface system. The user device may transition the user device from the first network to the second network based on the indication of the interface.

In some embodiments, the user device receives an indication that an error has occurred during the transition of the user device from the first network to the second network from the roaming network interface system. The user device may indicate to a user of the device that an error has occurred during the transition of the user device from the first network to the second network. The user device may indicate to the user that the service provided to the user device may be interrupted.

In some embodiments, the user device detects a third network which is a roaming network for the user device. The user device may detect a signal strength of the third network. The user device may transmit an indication of the third network and an indication of the signal strength of the third network to the roaming network interface system. The indication transmitted by the user device may include a Public Land Mobile Network ("PLMN") code referring to the third network. The indication transmitted by the user device may include an E-UTRA Absolute Radio Frequency Channel Number ("EARFCN") referring to the third network. The user device may receive an indication of whether the third network implements an interface for transitioning a user device from a first network to a second network from the roaming network interface system. The user device may obtain the indication of whether the third network implements an interface from the third network. The indication of whether the third network implements an interface may include an indication of the type of interface the third network implements. The user device may store the indication of whether the third network implements an interface, such as within a data table.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example of an environment 100 in which the roaming network interface system 200 is implemented. It is to be appreciated that FIG. 1 illustrates just one example of an environment 100 and that the various embodiments discussed herein are not limited to the use of such an environment. The environment 100 includes a primary network 103, a roaming network 105, and a user device 107.

The primary network 103 includes a radio access network ("RAN") 111, an AMF 113, and a roaming network interface system 200. The roaming network interface system 200 is described further in FIG. 2. The RAN 111 acts as a bridge between individual devices connected to the primary network 103 and other parts of the network, such as the AMF 113 and roaming network interface system 200.

The AMF 113 is a control plane function within the primary network and allows user equipment, such as the user device 107, to register and de-register with the primary network 103. The AMF 113 is also able to provide multiple types of interfaces to user equipment to facilitate transitioning user equipment from the primary network 103 to a secondary network, such as the roaming network 105, as a result of being able to communicate with the roaming network interface system 200. Thus AMF 113 is able to minimize, or eliminate, any interruption in service which may be caused by transitioning the user device 107 to a secondary network, such as the roaming network 105.

The roaming network 105 includes an MME 121. The MME 121 is used by the roaming network 105 to receive connection and session related information for user equipment. The MME 121 is thus used by the roaming network 105 to assist in facilitating the transition of the user device from the primary network 103 to the roaming network 105.

The user device 107 may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc.,—routers, digital assistants, personal assistant devices—such as Amazon Alexa, Google Home, etc.,—drones, etc. The user device 107 may interconnect to one or more communications media or sources, such as routers, network switches, modems, etc., to transmit communications to other devices. The user device 107 may be associated with a subscriber account managed by the telecommunication network 101. The user device 107 may include an interface implementation table 300 which is discussed further in FIG. 3.

The primary network 103 and roaming network 105 (collectively "networks 103 and 105") are networks, communication systems, or networked systems (not shown), to which the user device 107 and other devices may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more user devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of user devices are communicatively coupled together. Thus, such a network enables the user device 107 to communicate with one or more components of the primary network 103 and one or more components of the roaming network 105. In some embodiments, the roaming network 105 is a 4G network and the primary network 103 is a 5G network. In some embodiments, the user device 107 communicates with one or more components of the networks 103 and 105 through a RAN, such as the RAN 111.

The above description of the environment 100, and the various networks, devices, and functions therein, is intended as a broad, non-limiting overview of an example environment in which various embodiments of a roaming network interface system can operate. The environment 100, and the various devices therein, may contain other devices, systems and/or media not specifically described herein. The environment 100, and the various functions therein, may contain other functions, systems and/or media not specifically described herein.

Example embodiments described herein provide applications, tools, data structures and other support to implement systems and methods for transitioning a user device from a primary network to a roaming network, such as the primary network 103 and roaming network 105 respectively. The example embodiments described herein additionally provide applications, tools, data structures and other support to implement systems and methods for determining the types of interfaces implemented by roaming networks for transitioning a user device from a primary network to the roaming network. Other embodiments of the described techniques may be used for other purposes, including for ensuring that a user device is transitioned from a primary network to a roaming network with as little interruption in the service provided to the user device as possible. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
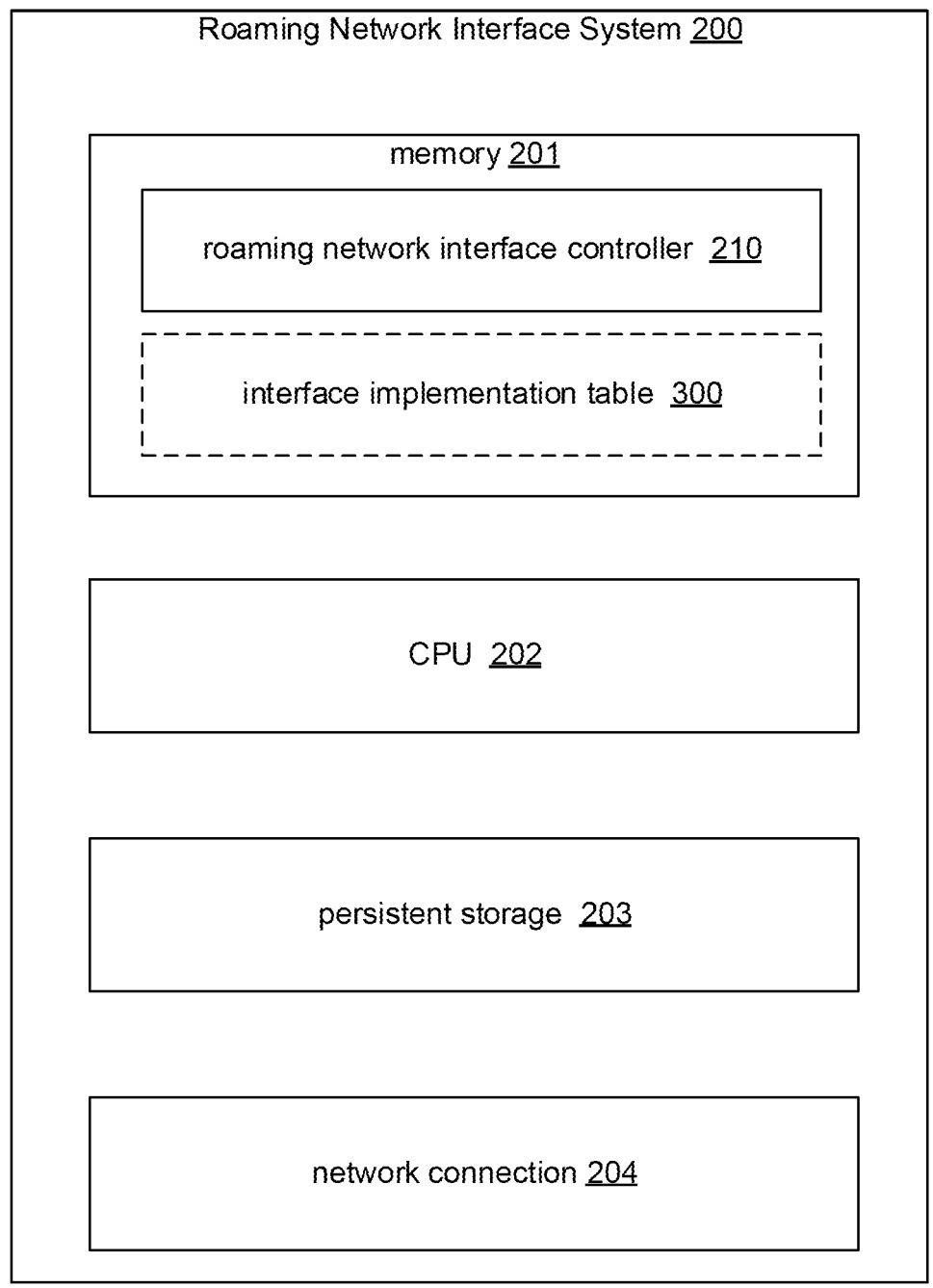
FIG. 2 is a block diagram depicting example components incorporated in a roaming network interface system, according to various embodiments described herein.

FIG. 2 is a block diagram depicting example components incorporated in a roaming network interface system 200, according to various embodiments described herein. In various embodiments, the roaming network interface system 200 includes one or more of the following: a computer memory 201 for storing programs and data while they are being used, including data associated with roaming networks, such as roaming network 105, the primary network 103, and user devices, such as the user device 107, an operating system including a kernel, and device drivers; a central processing unit (CPU) 202 for executing computer programs; a persistent storage device 203, such as a hard drive or flash drive for persistently storing programs and data; and a network connection 204 for connecting to one or more computer devices, functions or components of the primary network 103, user devices, such as the user device 107, roaming networks, such as the roaming network 105, other systems in the telecommunication network, and/or other computer systems, to send and/or receive data, such as via the Internet or another network and associated networking hardware, such as switches, routers, repeaters, electrical cables and optical fibers, light emitters and receivers, radio transmitters and receivers, and the like. In various embodiments, the roaming network interface system 200 additionally includes input and output devices, such as a keyboard, a mouse, display devices, etc.

While a roaming network interface system 200 configured as described may be used in some embodiments, in various other embodiments, the roaming network interface system 200 may be implemented using devices of various types and configurations, and having various components. The memory 201 may include a roaming network interface controller 210 which contains computer-executable instructions that, when executed by the CPU 202, cause the roaming network interface system 200 to perform the operations and functions described herein. For example, the programs referenced above, which may be stored in computer memory 201, may include or be comprised of such computer-executable instructions. The memory 201 may also include an interface implementation table 300, which is described further with respect to FIG. 3.

The roaming network interface controller 210 performs the core functions of the roaming network interface system 200, as discussed herein and also with respect to FIGS. 3 through 7. In particular, the roaming network interface controller 210 determines whether a roaming network implements an interface used to transition a user device from a primary network to a roaming network. In some embodiments, the primary network implements an MME, and the roaming network implements an AMF. Additionally, the roaming network interface controller 210 may detect whether an error occurred during the transition of the user device to the roaming network from the primary network. Furthermore, the roaming network interface controller 210 may determine a type of interface implemented by the roaming network for transitioning a user device from a primary network to a roaming network, such as an N26 interface, an S8 interface, or another interface used to transition a user device from a primary network to a roaming network.

In an example embodiment, the roaming network interface controller 210 and/or computer-executable instructions stored on memory 201 of the roaming network interface system 200 are implemented using standard programming techniques. For example, the roaming network interface controller 210 and/or computer-executable instructions stored on memory 201 of the roaming network interface system 200 may be implemented as a "native" executable running on CPU 202, along with one or more static or dynamic libraries. In other embodiments, the roaming network interface controller 210 and/or computer-executable instructions stored on memory 201 of the roaming network interface system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the roaming network interface system 200.

In addition, programming interfaces to the data stored as part of the roaming network interface controller 210 can be available by standard mechanisms such as through C, C++, C#, Java, and Web APIs; libraries for accessing files, databases, or other data repositories; through scripting languages such as JavaScript and VBScript; or through Web servers, FTP servers, or other types of servers providing access to stored data. The roaming network interface controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the roaming network interface system 200, primary network 103, roaming network 105, and user device 107.

Furthermore, in some embodiments, some or all of the components/portions of the roaming network interface controller 210, and/or functionality provided by the computer-executable instructions stored on memory 201 of the roaming network interface system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 3 is a table diagram depicting an interface implementation data table 300, according to various embodiments described herein. The interface implementation data table 300 includes data describing various telecommunication networks, interfaces related to transitioning a user device to a roaming network, and other data used to transition a user device to a roaming network. In some embodiments, the interface implementation data table 300 is included in one or more of: at least one user device, such as the user device 105, the primary network 103, a roaming network 105, or another device or network involved with transitioning a user device to a roaming network. The interface implementation data table 300 includes a network identification column 320, a network type column 321, and an interface type column 322. In some embodiments, the interface implementation data table 300 includes additional data used to transition a user device to a roaming network.

The network identification column 320 includes information identifying a telecommunication network, such as the primary network 103, the roaming network 105, or other roaming networks. The network identification column 320 may include one or more of: a PLMN, an ERFCN, and other data or information used to identify a telecommunication network. The network type column 321 includes information identifying a type of a telecommunication network, such as a 4G network, 5G network, or other types of telecommunication networks. The interface type column 322 includes information specifying an interface implemented by a telecommunication network used to transition a user device from a primary network to the telecommunication network.

For example, row 301 identifies the "Primary Network" as a "5G" network which implements an N26 interface. Thus, a user device which is transitioned to the "Primary Network" is able to use the N26 interface to transition to the primary network. Likewise, row 303 identifies "Roaming Network 2" as a "4G" network which implements an S8 interface. As a result, a user device which transitions to the "Roaming Network 2" uses the S8 interface to transition to "Roaming Network 2."

Figure 4:
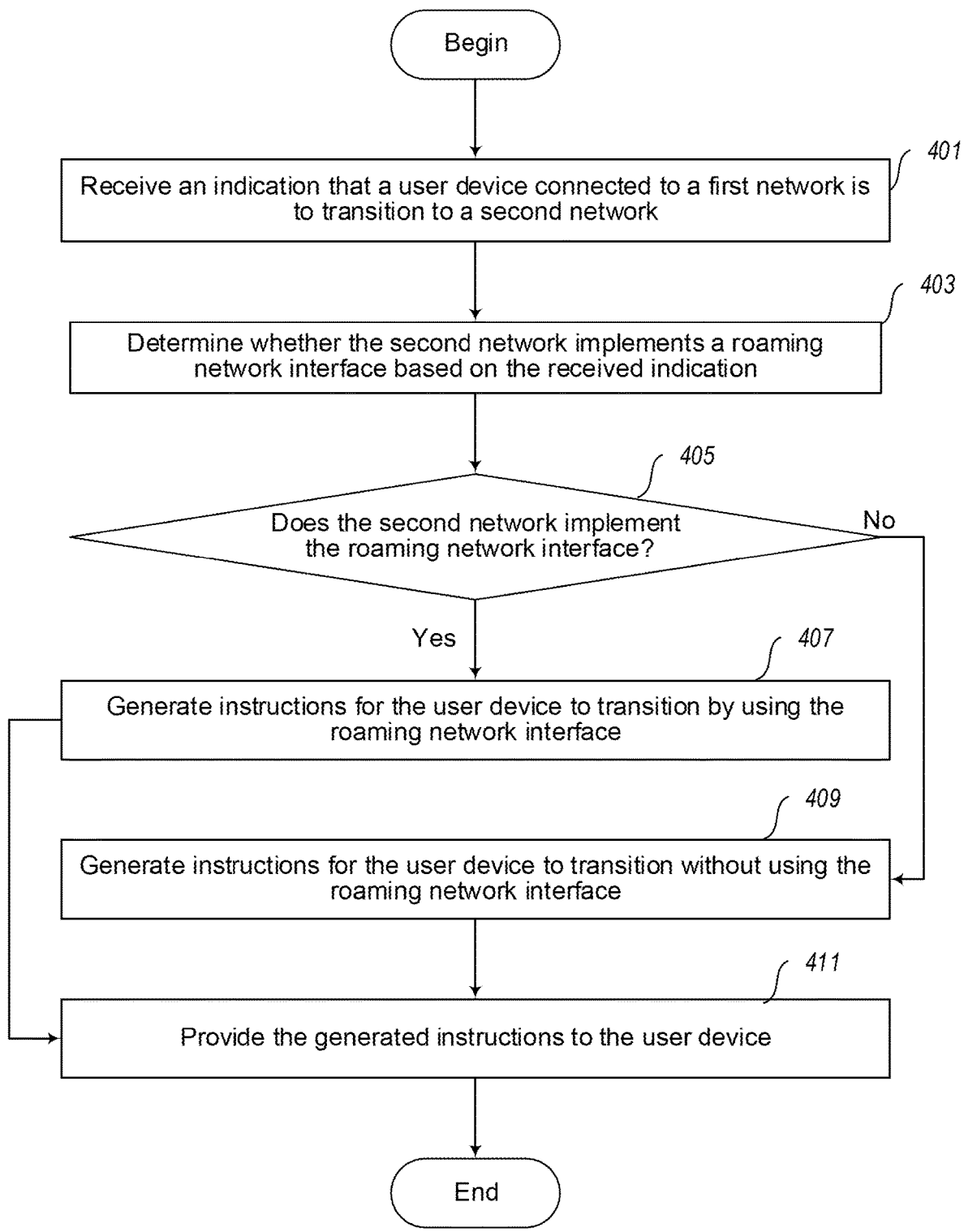
FIG. 4 is a flow diagram depicting a process to provide instructions to a user device regarding transitioning the user device from a first network to a second network, according to various embodiments described herein.

FIG. 4 is a flow diagram depicting a process to provide instructions to a user device regarding transitioning the user device from a first network to a second network, according to various embodiments described herein. At act 401, a roaming network interface system, such as the roaming network interface system 200, receives an indication that a user device connected to a first telecommunication network is to transition to a second telecommunication network. The indication that the user device is to transition to a second telecommunication network may be in response to an indication that a signal strength of one or more signals provided by the second telecommunication network is stronger than the signal strength of one or more signals provided by the first telecommunication network. The first network and second network may be networks provided by the same telecommunication provider, different telecommunication providers, etc. The first network may be a 5G network and the second network may be a 4G network, or vice versa.

At act 403, the roaming network interface system determines whether the second network implements a roaming network interface based on the received indication. In some embodiments, the roaming network interface system determines whether the second network implements the roaming network interface by accessing at least one of: an interface implementation data table, such as the interface implementation data table 300, and the second telecommunication network. The determination of whether the second network implements the roaming network interface may include an indication of the type of interface implemented by the second network. At act 405, if the second network implements the roaming network interface, the process proceeds to act 407, otherwise, the process proceeds to act 409. In some embodiments, at act 405, the process proceeds to act 407 if the roaming network interface implemented by the second network is an N26 interface. In some embodiments, at act 405, the process proceeds to act 409 if the roaming network interface implemented by the second network is an interface other than an N26 interface, such as an S8 interface.

At act 407, the roaming network interface system generates instructions for the user device to transition to the second network from the first network by using the roaming network interface based on a determination that the second network implements the roaming network interface. The generated instructions may include one or more of: instructions for the type of data the user device must send to the roaming network interface, an indication of the interface used by the second network, or other information used by a user device to access a roaming network interface for transitioning the user device to another telecommunication network.

At act 409, the roaming network interface system generates instructions for the user device to transition to the second network without using the roaming network interface based on a determination that the roaming network interface is not implemented by the second network. The generated instructions may include an alternative roaming network interface which is implemented by the second network. In some embodiments, the generated instructions include instructions to cause the user device to indicate to a user that the service provided to the user device may be interrupted, such as, for example, causing the user device to generate an alert message, causing the user device to make a noise, or other methods of alerting a user that service provided to the user device may be interrupted.

Acts 407 and 409 each proceed to act 411, where the roaming network interface system provides the generated instructions to the user device.

After act 411, the process ends.

In some embodiments, the process 400 is performed while the user device is using the first network to: make or receive a phone call; access the internet; send or receive messages, such as MMS or SMS messages; or perform other functions that a user device requires a connection to a network to perform.

Figure 5:
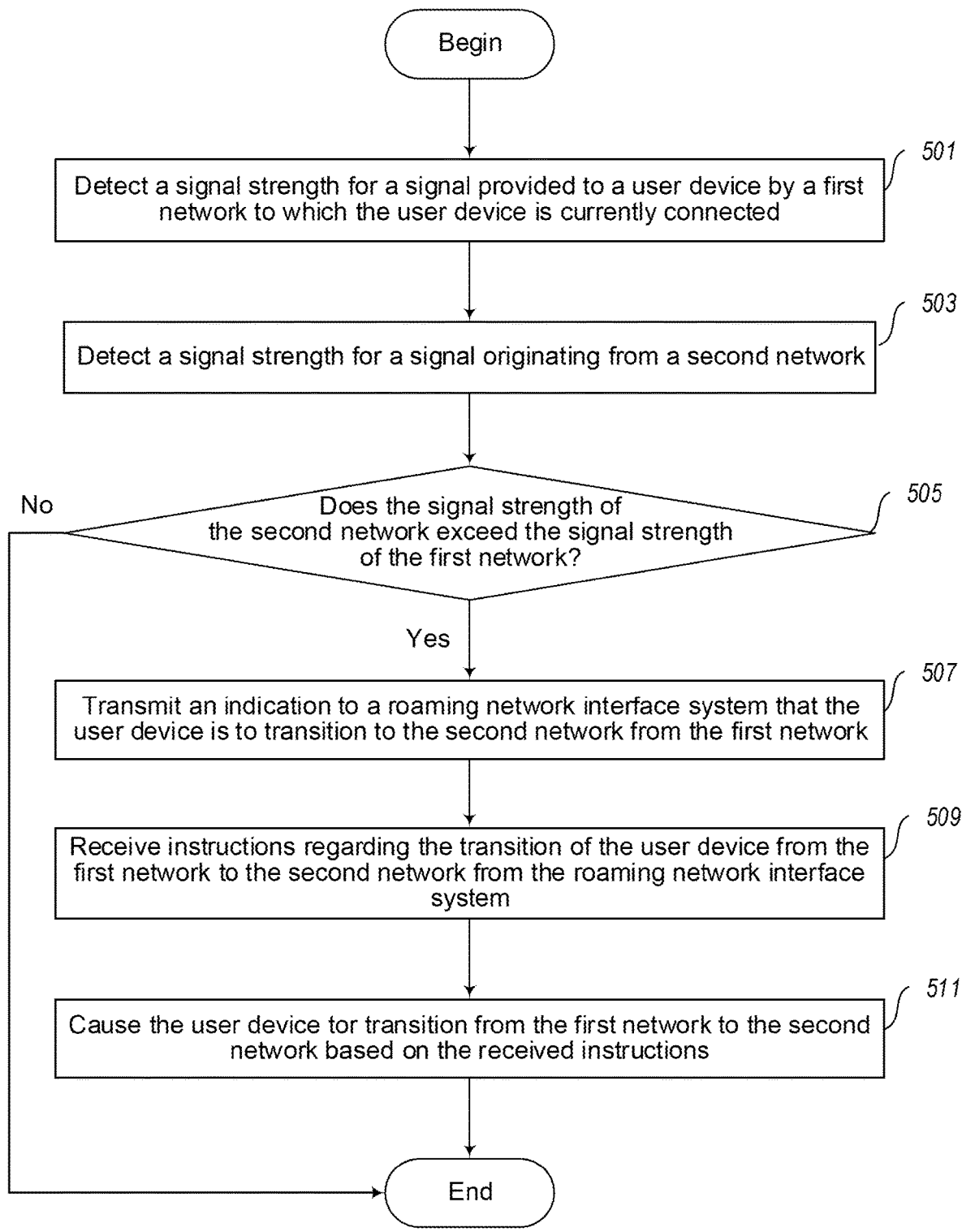
FIG. 5 is a flow diagram depicting a process for a user device to transition from a first telecommunication network to a second telecommunication network, according to various embodiments described herein.

FIG. 5 is a flow diagram depicting a process for a user device to transition from a first telecommunication network to a second telecommunication network, according to various embodiments described herein. First, at act 501, the user device detects a signal strength for a signal provided to the user device by a first telecommunication network to which the user device is currently connected. The first network may be a 5G network.

At act 503, the user device detects a signal strength for a signal originating from a second telecommunication network. The second telecommunication network may be a 4G network. The second telecommunication network may be implemented, operated, managed, etc., by the same network provider as the network provider which implements, operates, manages, etc., the first telecommunication network, or by another network provider. In some embodiments, the first network is a 4G network, and the second network is a 5G network.

At act 505, the user device determines whether the signal strength of the second network exceeds the signal strength of the first network. If the signal strength of the second network does not exceed the signal strength of the first network, the process ends. If the signal strength of the second network does exceed the signal strength of the first network, the process proceeds to act 507.

At act 507, the user device transmits an indication to a roaming network interface system that the user device is to transition to the second network from the first network. At act 509, the user device receives instructions from the roaming network interface system regarding the transition of the user device to from the first network to the second network. In some embodiments, the roaming network interface system uses the process described with respect to FIG. 4 to generate the instructions received by the user device in act 509.

At act 511, the user device is caused to transition from the first network to the second network based on the received instructions. In some embodiments, causing the user device to transition from the first network to the second network includes causing the user device to implement one or more roaming network interfaces provided by the roaming network interface system.

After act 511, the process ends. In some embodiments, the user device performs the process described with respect to FIG. 5 while the user device is using the first network to: make or receive a phone call; access the internet; send or receive messages, such as MMS or SMS messages; or perform other functions that a user device requires a connection to a network to perform.

Figure 6:
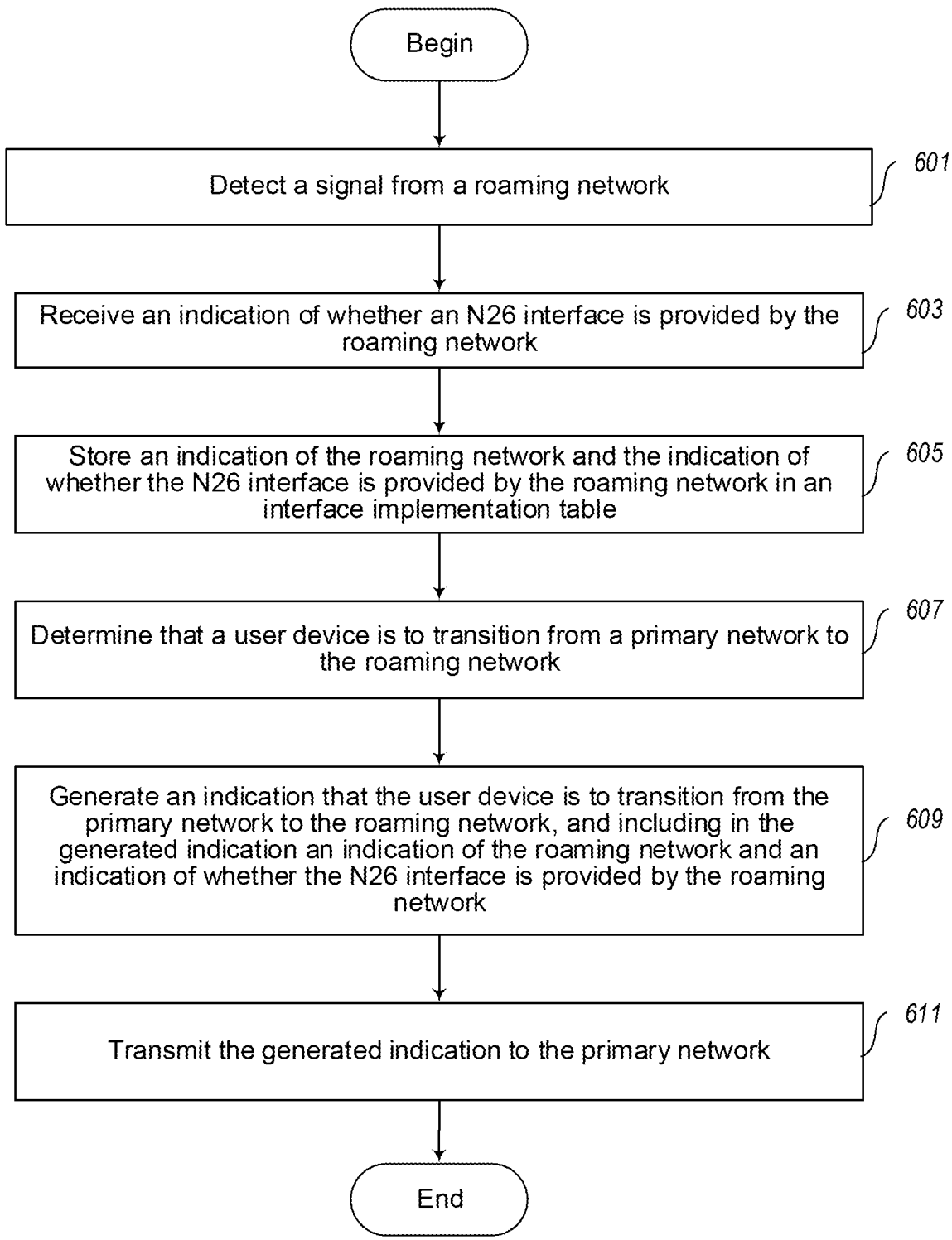
FIG. 6 is a flow diagram depicting a process for detecting interfaces implemented in roaming networks and generating an indication that a user device is to transition to a roaming network, according to various embodiments described herein.

FIG. 6 is a flow diagram depicting a process for detecting interfaces implemented in roaming networks and generating an indication that a user device is to transition to a roaming network, according to various embodiments described herein. First, at act 601, a user device detects a signal from a roaming network.

At act 603, the user device receives an indication of the type of roaming network interface, such as an N26 interface, that is provided by the roaming network. The user device may receive the indication of the type of roaming network interface by transmitting a request to the roaming network to provide an indication of the type of roaming network interface that the roaming network implements. The user device may receive the indication of the type of roaming network interface by transmitting an indication of the roaming network to a primary network to which the user device is currently connected, and receiving the indication of the type of roaming network interface used by the roaming network from the primary network. At act 605, the user device stores an indication of the roaming network and an indication of the type of interface used by the roaming network in an interface implementation data table. In some embodiments, a roaming network interface system implemented on a primary network performs acts 605. In some embodiments, the interface implementation data table includes information describing roaming networks and their interfaces which has been collected by a plurality of user devices.

At act 607, the user device determines that it is to transition from a primary network to the roaming network. The user device may make this determination in a similar manner to acts 501-505 described above in relation to FIG. 5.

At act 609, the user device generates an indication that the user device is to transition from the primary network to the roaming network. The generated indication includes at least an indication of the roaming network and an indication of the type of interface provided by the roaming network. At act 611, the generated indication is transmitted to the primary network.

After act 611, the process ends.

Figure 7:
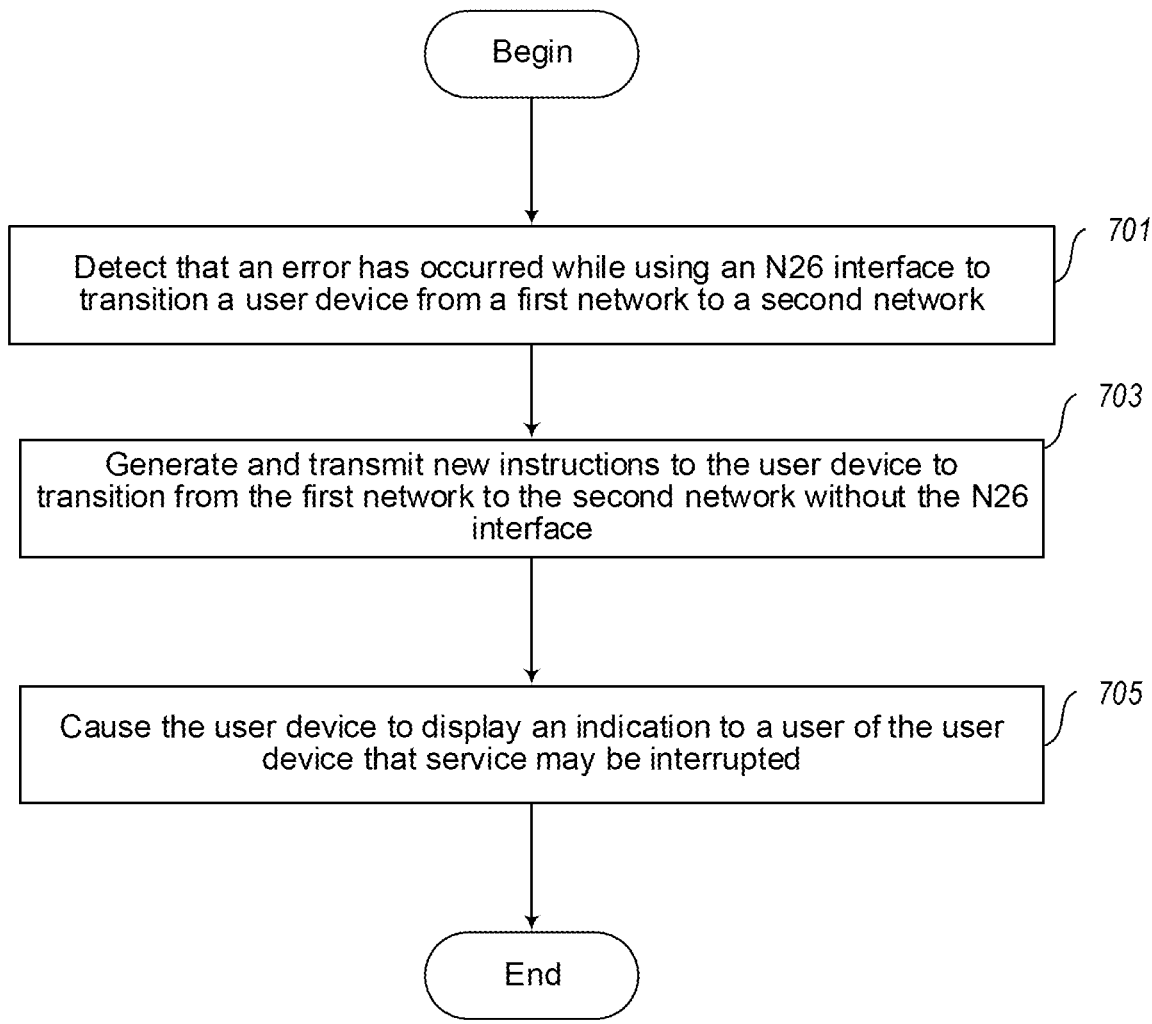
FIG. 7 is a flow diagram depicting a process to detect that an error has occurred using a roaming network interface and providing a second interface to the user device, according to various embodiments described herein.

FIG. 7 is a flow diagram depicting a process to detect that an error has occurred using a roaming network interface and providing a second interface to the user device, according to various embodiments described herein. First, at act 701, the roaming network interface system detects that an error has occurred while using an interface to transition a user device from a first network to a second network. The interface may be an N26 interface. The first network may be a 5G network and the second network may be a 4G network. An error may include one or more of: a failure of the interface to transition the user device, an indication that the interface is currently overloaded, or any other type of error that may occur when using an interface to transition a user device from a first network to a second network.

At act 703, the roaming network interface system generates new instructions for the user device to transition from the first network to the second network without using the interface. The roaming network interface system transmits the new instructions to the user device. The instructions may include instructions to use a different interface to transition the user device to the second network, such as an S8 interface.

At act 705, the roaming network interface system causes the user device to display an indication to a user of the user device that the service may be interrupted. The indication that the service may be interrupted may include an alert message, causing the user device to make a sound or play an audio message, or other methods of alerting or indicating information to a user with a user device.

After act 705, the process ends. In some embodiments, the roaming network interface system performs the process described with respect to FIG. 7 while the user device is using the first network to: make or receive a phone call; access the internet; send or receive messages, such as MMS or SMS messages; or perform other functions that a user device requires a connection to a network to perform. Thus, in such embodiments, the roaming network interface system is able to provide a warning to a user when transitioning from the first network to the second network will affect the quality of service provided to the user device.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor; and
   at least one memory coupled to the at least one processor, the memory having computer-executable instructions stored thereon that, when executed by the at least one processor, cause the system to:
     receive an indication that a user device using a first network is to transition to a second network, wherein the second network is a roaming network;
     determine, based on the received indication, whether the second network implements an interface between a mobility management entity (MME) and an access and mobility management function (AMF);
     provide instructions to the user device to transition from the first network to the second network based on the determination of whether the second network implements the interface;
     detect whether an error occurred during the transition of the user device to the second network from the first network; and
     based on a detection that an error occurred during the transition of the user device, provide instructions to the user device to connect to the second network without the interface.

2. The system of claim 1, wherein causing the system to provide the instructions further comprises causing the system to:
   provide the interface to the user device based on a determination that the second network implements the interface.

3. The system of claim 2, wherein the interface is an N26 interface.

4. The system of claim 1, wherein causing the system to provide the instructions to connect to the second network without the interface further comprises causing the system to:
   cause the user device to indicate to the user that networking service may be interrupted.

5. The system of claim 1, wherein the system is further caused to:
   receive an indication of one or more networks from one or more user devices, the indication of one or more networks including an indication of a signal strength of each network of the one or more networks, the indication of the one or more networks including an indication of the second network; and
   for each network of the one or more networks, determine whether the network implements an interface between an MME and an AMF.

6. The system of claim 5, wherein causing the system to determine whether the second network implements the interface further comprises causing the system to:
   determine whether the second network implements the interface based on the indication of one or more networks and the determination of whether the second network implements an interface between an MME and an AMF.

7. A method in a roaming network interface system, the method comprising:
   electronically receiving, by at least one processor, an indication that a user device using a first network is to transition to a second network, wherein the first network is a roaming network;
   electronically determining, by the at least one processor, whether the second network implements an interface between a mobility management entity (MME) and an access and mobility management function (AMF) based on the received indication that the user device is to transition to a second network;
   electronically providing, by the at least one processor, instructions to the user device to transition from the first network to the second network based on the determination of whether the second network implements the interface;
   electronically detecting, by the at least one processor, that an error occurred during the transition of the user device to the second network from the first network; and
   electronically causing, by the at least one processor, the user device to connect to the second network without the interface.

8. The method of claim 7, wherein electronically providing the instructions further comprises:
   electronically providing, by the at least one processor, the interface to the user device based on a determination that the second network implements the interface.

9. The method of claim 7, wherein electronically providing the instructions further comprises:
   electronically causing, by the at least one processor, the user device to indicate to the user that networking service may be interrupted.

10. The method of claim 7, further comprising:
    electronically receiving, by the at least one processor, an indication of one or more networks from one or more user devices, the indication of one or more networks including an indication of a signal strength of each network of the one or more networks, the indication of the one or more networks including an indication of the second network; and for each network of the one or more networks, electronically determining, by the at least one processor, whether the network implements an interface between an MME and an AMF.

11. The method of claim 10, wherein electronically determining whether the second network implements the interface further comprises:
electronically determining, by the at least one processor, whether the second network implements the interface based on the indication of one or more networks and the determination of whether the second network implements an interface between an MME and an AMF.

12. A non-transitory processor-readable storage medium that stores at least one of instructions or data, the instructions or data, when executed by at least one processor, cause the at least one processor to perform a method comprising:
receiving an indication that a user device using a first network is to transition to a second network, wherein at least one of the first network and second network is a roaming network;
determining whether the second network implements an interface between a mobility management entity (MME) and an access and mobility management function (AMF) based on the received indication that the user device is to transition to the second network;
causing the user device to transition from the first network to the second network based on the determination of whether the second network implements the interface;
detecting whether an error occurred during the transition of the user device to the second network from the first network; and
based on a detection that an error occurred during the transition, causing the user device to connect to the second network without the interface.

13. The non-transitory processor-readable storage medium of claim 12, wherein causing the user device to transition from the first network to the second network further comprises:
providing the interface to the user device based on a determination that the second network implements the interface.

14. The non-transitory processor-readable storage medium of claim 12, wherein causing the user device to transition from the first network to the second network further comprises:
causing the user device to indicate to the user that networking service may be interrupted.

15. The non-transitory processor-readable storage medium of claim 12, wherein the method further comprises:
receiving an indication of one or more networks from one or more user devices, the indication of one or more networks including an indication of a signal strength of each network of the one or more networks, the indication of the one or more networks including an indication of the second network; and
for each network of the one or more networks, determining whether the network implements an interface between an MME and an AMF.

16. The non-transitory processor-readable storage medium of claim 15, wherein determining whether the second network implements the interface further comprises:
determining whether the second network implements the interface based on the indication of one or more networks and the determination of whether the second network implements an interface between an MME and an AMF.

* * * * *